United States Patent [19]

Hirano et al.

[11] Patent Number: 5,089,184
[45] Date of Patent: Feb. 18, 1992

[54] OPTICAL MOLDING METHOD

[75] Inventors: Yoshinao Hirano; Shigeru Nagamori; Katsumi Sato; Katsuhide Murata, all of Chiba, Japan

[73] Assignee: Mitsui Engineering and Shipbuilding Co., Ltd., Tokyo, Japan

[21] Appl. No.: 451,890

[22] Filed: Dec. 18, 1989

[30] Foreign Application Priority Data

Jan. 18, 1989 [JP] Japan ................................. 1-9178
Jan. 18, 1989 [JP] Japan ................................. 1-9179

[51] Int. Cl.$^5$ .................... B29C 35/08; B29C 41/02
[52] U.S. Cl. .................... 264/22; 156/273.5; 156/275.5; 156/307.1; 250/432 R; 250/492.1; 264/308; 427/43.1; 427/54.1
[58] Field of Search ............. 264/1.4, 22, 236, 255, 264/308; 156/242, 272.8, 273.3, 273.5, 275.5, 307.1; 250/432 R, 492.1; 364/468, 474.05, 474.08, 474.24, 520, 521, 522, 523; 427/43.1, 53.1, 54.1, 407.1

[56] References Cited

U.S. PATENT DOCUMENTS

| 4,575,330 | 3/1986 | Hull ................................ 425/174.4 |
| 4,801,477 | 1/1989 | Fudim ............................. 427/54.1 |

FOREIGN PATENT DOCUMENTS

| 171069 | 2/1986 | European Pat. Off. . |
| 338751 | 10/1989 | European Pat. Off. . |
| 60-247515 | 12/1985 | Japan .............................. 264/22 |
| 62-3966 | 2/1987 | Japan . |
| 62-101408 | 5/1987 | Japan .............................. 264/22 |
| 63-139729 | 6/1988 | Japan ............................. 425/174.4 |
| 63-139730 | 6/1988 | Japan ............................. 425/174.4 |
| 2-24120 | 1/1990 | Japan ............................. 425/174.4 |
| WO88/06494 | 9/1988 | PCT Int'l Appl. . |

Primary Examiner—Leo B. Tentoni
Attorney, Agent, or Firm—Kanesaka and Takeuchi

[57] ABSTRACT

In one method, a base for supporting a cured object is brought into close contact with or close to an aperture of a container so as to remove the bubbles therebetween. When one layer is formed, parts of the layer may be successively formed, wherein the base is moved back and forth to separate each part. Also, the aperture or container with the aperture may be inclined relative to the base to separate the layer from the aperture.

2 Claims, 10 Drawing Sheets

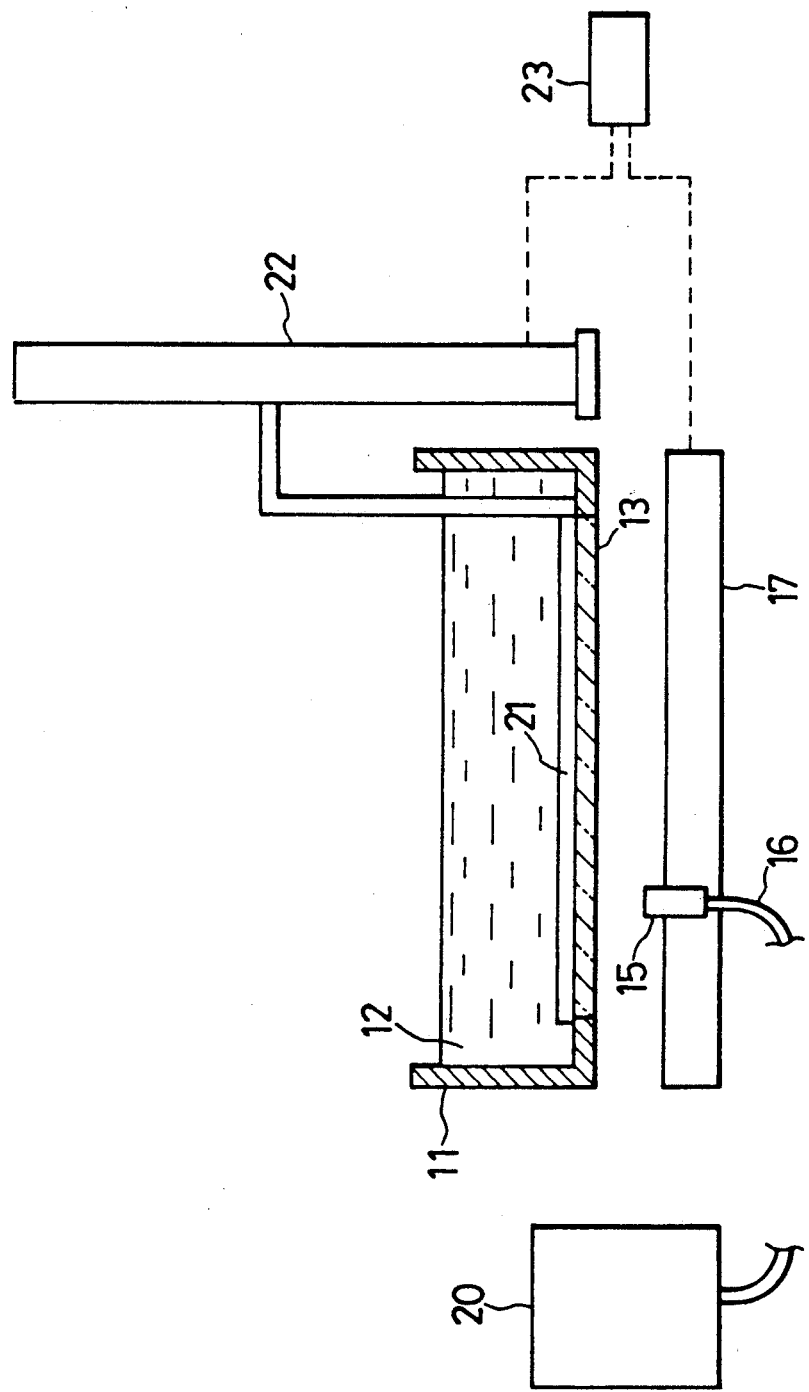

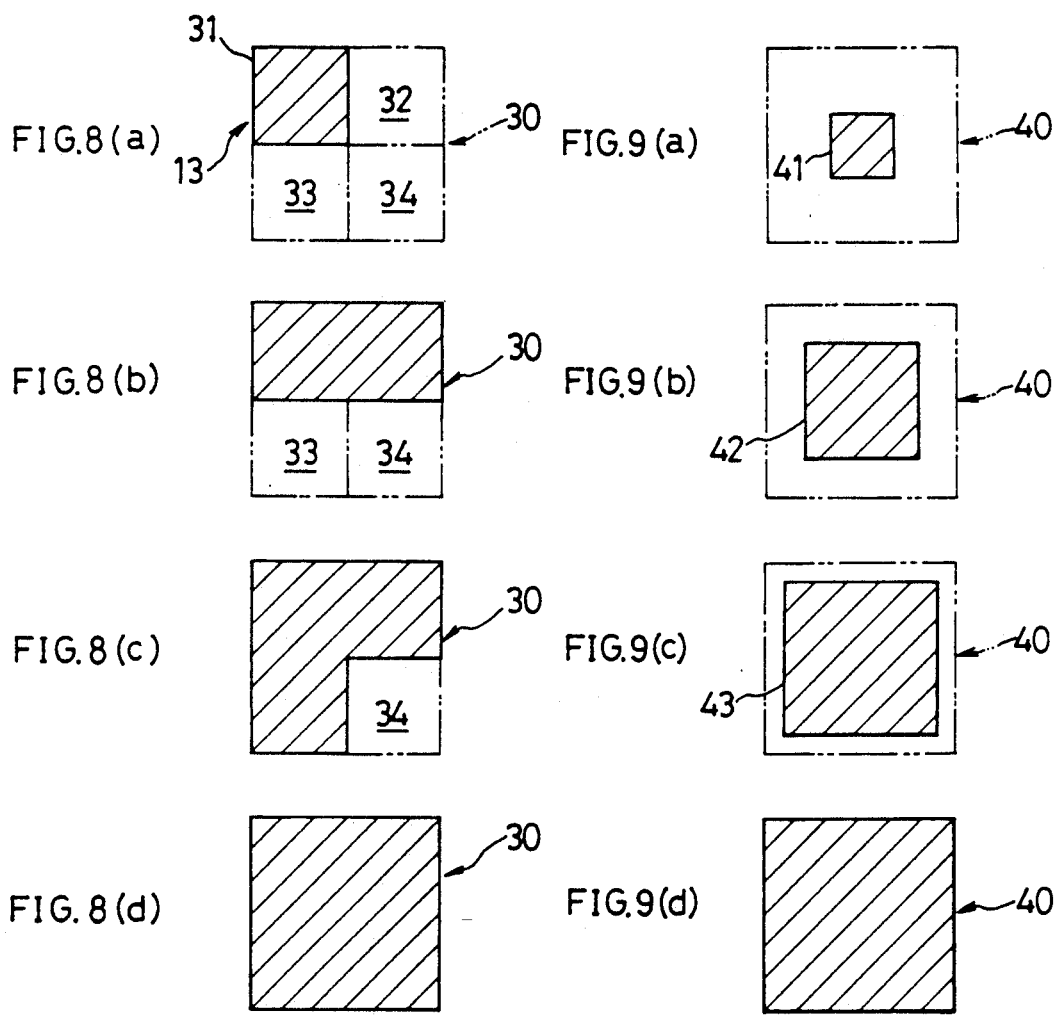

OPTICAL MOLDING METHOD

FIELD OF THE INVENTION AND RELATED ART STATEMENT

The present invention relates to an optical molding method for producing a cured object having a desired shape by radiating light onto a photocurable resin. More particularly, the present invention relates to an optical molding method in which light is radiated onto a photocurable resin in a container through an aperture provided on the container.

Optical molding methods for optically producing a target object by repeating the process of radiating a light flux on a photocurable resin so as to cure the irradiated portion and extend the cured portion continuously in the horizontal direction, supplying a photocurable resin on the upper side of the cured portion and radiating a light flux on the resin so as to also extend the cured portion continuously in the vertical direction are known as disclosed in, for example, Japanese Patent Laid-Open Nos. 247515/1985, 35966/1987 and 10140/1987. A method of using a mask in place of scanning by a light flux is also known.

FIG. 3 shows the structure of an apparatus for explaining one of these optical molding methods.

In a container 11 provided with a stirrer 10, a photocurable resin 12 is accommodated, and an optical system which is composed of a lens 15A, a mirror 16A, a mirror rotating device 17A and a light source 20 is provided so as to radiate light onto the liquid surface 12a of the photocurable resin 12.

A base 21 is disposed in the container 11 so as to be lifted and lowered by an elevator 22. The mirror rotating apparatus 17A and the elevator 22 are controlled by a computer 23.

When a cured object is produced by the above-described apparatus, the base 21 is first located slightly below the liquid surface 12a and the light flux 14 is scanned to form a horizontal section of the target object. The scanning operation is carried out by the rotation of the mirror 16A which is controlled by the computer 23.

After the entire surface of that horizontal section (the portion corresponding to the bottom surface, in this case) of the target object has been irradiated with light, the base 21 is lowered at a predetermined pitch and an uncured photocurable resin is poured between the cured object 24 and the base 21, and light is radiated in the same way as above. By repeating this process, the cured object having the intended configuration is obtained.

One of these methods adopts an apparatus including a container having an aperture on the bottom surface or a side surface thereof, a device for radiating a light flux through the aperture, and a base provided in the container in such a manner as to be movable away from the aperture. This optical molding method will be explained with reference to FIG. 2.

In FIG. 2, a photocurable resin 12 is accommodated in a container 11. On the bottom surface of the container 11, an aperture 13 made of a light transmitting plate such as a silica glass plate is provided. An optical system (light radiation device) is provided which is composed of a light emitting portion 15 with a built-in lens for radiating a light flux 14 onto the aperture 13, an optical fiber 16, an X-Y table 17 for moving the light emitting portion 15 in the X-Y direction in the horizontal plane, wherein X and Y are two directions orthogonal to each other, and a light source 20.

A base 21 is disposed in the container 11 so as to be lifted by an elevator 22. The X-Y table 17 and the elevator 22 are controlled by a computer 23.

When a cured object is produced by the above-described apparatus, the base 21 is first located slightly above the aperture 13 and the light flux 14 is scanned to form a horizontal section (the portion corresponding to the bottom surface or the upper surface, in this case) of the target object. The scanning operation is carried out by moving the X-Y table 17 controlled by the computer.

After the entire surface of that horizontal section of the target object has been irradiated with light, the base 21 is slightly lifted and an uncured photocurable resin is supplied between the cured object (cured layer) 24 and the base 21, and light is radiated in the same way as above. By repeating this process, the cured object having the intended configuration is obtained as a laminate.

As described above, in this kind of optical molding method, it is necessary to move the base at a predetermined pitch p after the formation of the n-th cured layer (n is an integer of not less than 1), and to coat the n-th cured layer with an uncured photocurable resin.

The pitch p agrees with the thickness of a cured layer to be formed at the next step, and it is ordinarily not more than 1 mm, in particular, as small as not more than 0.5 mm. Accordingly, it takes a very long time for the uncured photocurable resin 12 to flow onto the cured object 24 and uniformly cover the cured object 24 in the optical molding method shown in FIG. 3.

In the optical molding method shown in FIG. 2, a liquid pressure corresponding to the height of the liquid surface is applied between the cured object 24 and the aperture 13, so that the photocurable resin more easily flows into a gap between the cured object 24 and the aperture 13, but if the pitch p is particularly small, it takes a considerable time for the photocurable resin to fill the gap.

For this reason, in the prior art, a long standing time is required between the time when the base is moved by a predetermined pitch and the time when light radiation is started and, hence, the total molding time is unfavorably long.

In the optical molding method shown in FIG. 2, bubbles adhere to the surface of the base 21 and the surface of the aperture 13 on the inner wall side of the container 11 when the photocurable resin 12 is poured into the container 11, thereby causing a trouble such as the scattering of the radiated light or obstruction of the entrance of light between the base 21 and the aperture 13. There is also fear of producing pores in the target object by the bubbles which have adhered to the base surface and entered the target object.

In the optical molding apparatus shown in FIG. 2, it is necessary to move the cured object 24 away from the aperture 13 when lifting the base 21. This is because fi the cured object 24 is separated from the base 21, it is impossible to continue the molding process.

In the prior art, however, since the base 21 is lifted while keeping the base 21 and the aperture 13 in parallel with each other, the cured layer 24 as a whole is separated from the aperture 13 at one time. A very strong force is applied to the cured layer 24 at the moment of separation, thereby involving a fear of the cured layer 24 being separated from the base 21.

There is also a fear of the cured layers 24 being separated from each other from the interface. Such a phenomenon of separation between the cured layers 24 or between the cured layer and the base 21 is apt to occur in the later stage of the molding process when the total weight of the cured layer 24 increases. It is also apt to occur when the contact area between the aperture 13 and the cured layer 24 is large.

In addition, in the prior art, since a strong force is required for separating the cured layer 24 from the aperture 13, the elevator 22 is also required to have a strong driving force.

OBJECT AND SUMMARY OF THE INVENTION

Accordingly, it is an object of the present invention to eliminate the above-described problems in the related art and to provide an optical molding method including the step of moving a base at a predetermined pitch, which is capable of light radiation immediately after the movement of the base, thereby greatly shortening the molding time, and which is also capable of executing an optical molding method using photocurable resin having high viscosity as a material.

It is another object of the present invention to provide an optical molding method which is capable of radiating light onto a predetermined point at a necessary intensity without scattering the light, and which enables smooth entrance of a photocurable resin into a gap between a base and an aperture by removing bubbles from the surface of the base and the surface of the aperture.

It is still another object of the present invention to provide an optical molding method which is capable of preventing a cured layer from being separated from a base and cured layers from being separated from each other, and which is sufficed with an elevator having a small driving force and a base having small strength and rigidity.

To achieve this aim, in a first aspect of the present invention, there is provided an optical molding method for producing an object by laminating cured layers in series by moving a base at a predetermined pitch and radiating light, characterized in that when the base is moved by a predetermined pitch p, the base is first moved by a distance p+1, which is larger than a predetermined pitch p, and then bringing back the base by the distance 1.

According to this method, a photocurable resin swiftly flows onto the cured layer or between the cured layer and the aperture when the base is moved by the distance p+1. Since the movement of the base itself is swiftly carried out by a driving apparatus, the period between the time for the formation of the n-th layer and the time for radiation of light for the formation of the (n+1)th layer after moving the base by the predetermined pitch p is greatly shortened.

In a second aspect of the present invention there is provided an optical molding method for producing an object having a desired shape by laminating a multiplicity of cured layers of photocurable resin each of which corresponds to a section of the target object by radiating light from an aperture on a container and gradually moving a base away from the aperture, characterized in that the base is brought into close contact with or close to the aperture so as to remove bubbles out of the gap between the base and the aperture prior to the molding process.

According to this method, since the removal of bubbles from the surface of the base and the surface of the aperture on the inner wall side of the container is secured, the emitted light is radiated onto the photocurable resin without being scattered. The photocurable resin smoothly flows between the base and the aperture. In addition, no bubbles are mixed into the cured body of the photocurable resin.

In a third aspect of the present invention, there is provided an optical molding method for producing an object having a desired shape by laminating a multiplicity of cured layers of a photocurable resin each of which corresponds to a section of the target object by radiating light from an aperture on a container and gradually moving a base away from the aperture, characterized in that when one layer is formed, the base is moved away from the aperture so as to separate the cured object from the aperture after the formation of a part of the cured layer, the base is thereafter moved toward the aperture so as to bring the cured object into close contact with the aperture, and a next part of the layer is formed.

According to this method, since the cured layer is separated from the aperture while the contact area between the cured layer and the aperture is small, a small force suffices for lifting the cured layer at the time o separating the cured layer from the aperture. Therefore, the separation between the cured layer and the base is prevented and the separation between the cured layers is also prevented.

In a fourth aspect of the present invention, there is provided an optical molding method for producing an object having a desired shape by laminating a multiplicity of cured layers of a photocurable resin each of which corresponds to a section of the target object by radiating light from an aperture on a container and gradually moving a base away from the aperture, characterized in that the aperture is inclined so as not to be parallel to the base when the base is lifted, thereby separating the cured layer from the aperture form one end side of the cured layer.

According to this method, since the cured layer is separated from the aperture from one end side of the cured layer, a small force suffices for lifting the cured layer at the time of separating the cured layer from the aperture. Therefore, the separation between the cured layer and the base is prevented and the separation between the cured layers is also prevented.

The above and other objects, features and advantages of the present invention will become clear from the following description of the preferred embodiments thereof, taken in conjunction with the accompanying drawings.

BRIEF DESCRIPTION OF THE DRAWINGS

FIGS. 2, 3, 5, 6 and 7 are sectional views of optical molding apparatuses;

FIGS. 8(a) to 8(d), 9(a) to 9(d), 10(a) to 10(d), 11(a) to 11(d) and 12(a) to 12(d) are plan views explaining a third embodiment of an optical molding method according to the present invention;

DESCRIPTION OF THE PREFERRED EMBODIMENTS

Preferred embodiments of the present invention will be explained hereinunder with reference to the accompanying drawings.

Figure 1:
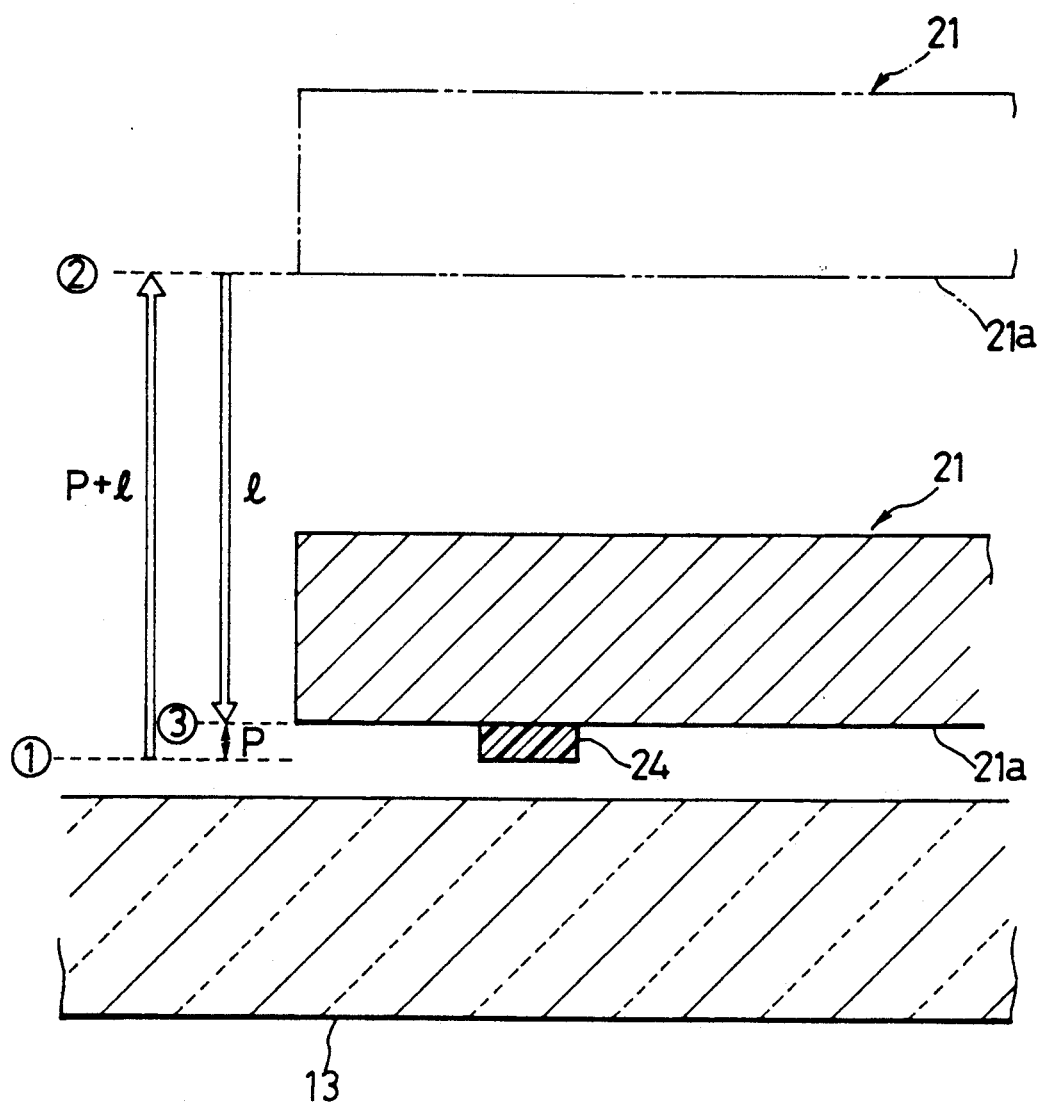
FIGS. 1 and 4 are enlarged views of a base portion showing a first embodiment of an optical molding method according to the present invention.
Figure 2:
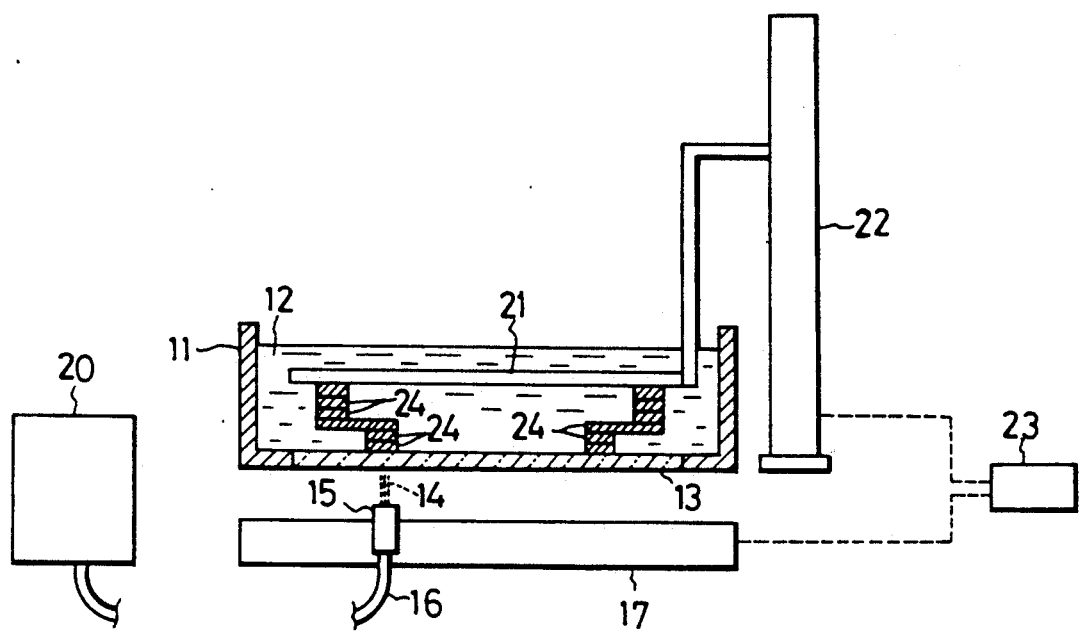

FIG. 1 shows a method of operating the base in the case of executing a first embodiment of an optical molding method according to the present invention by using the apparatus shown in FIG. 2.

FIG. 1 shows the state in which a second cured layer is being formed after formation of the cured object 24 in the first layer. In FIG. 1, the base 21 is first located with the under surface 21a thereof at a level indicated by the numeral (1), and the cured object 24 is formed by radiating light. The base 21 is thereafter lifted by the distance p+1 so that the under surface 21a is at a level indicated by the numeral (2). Thereafter, the base 21 is lowered by the distance 1 so that the under surface 21a is stopped at a level indicated by the numeral (3). If the base 21 is moved in the order of (1) to (3) in this way, when the under surface 21a is lifted to the level (2), a very large gap 1 is formed between the cured object 24 adhered to the base 21 and the aperture 13. Therefore, even if the uncured photocurable resin 12 has a considerably high viscosity, the photocurable resin 12 rapidly flows into the gap between the cured object 24 and the aperture 13. As a result of various experiments, it has been observed that when the pitch p is about 0.1 to 1 mm, the distance 1 is preferably not less than one time, more preferably 5 to 30 times, particularly 10 to 20 times of the pitch p.

In FIG. 1, only the case of moving the base 21 for the formation of the second layer is shown, but the movement of the base for the formation of third and later layers is carried out in the same way. This embodiment is also adaptable to the case of lifting the base 21 by the pitch p after removing the bubbles which have adhered to the under surface 21a of the vase 21 or the surface of the aperture 13 by bringing the under surface 21a of the base 21 into close contact with the aperture 13.

After all the layers of the intended configuration have been formed, the cured object 24 is removed from the base 21 and subjected to finishing, if necessary, thereby producing the target object.

In this embodiment, the aperture 13 is provided on the bottom surface of the container 11 and light is radiated from below the container 11. Alternatively, the aperture 13 may be provided on a side surface of the container 11 and light is radiated from the side surface of the container 11. In this case, the base 21 is gradually moved sideways in the production process.

Figure 3:
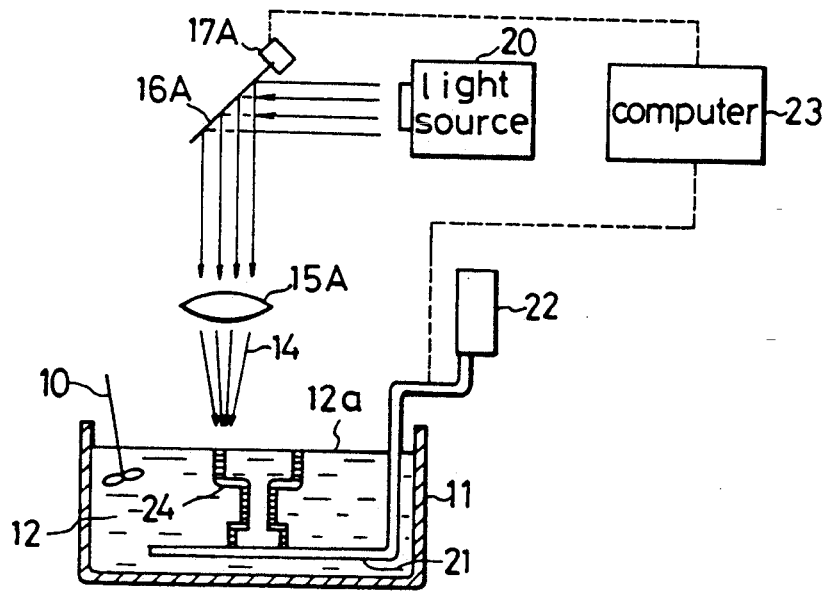
Figure 4:
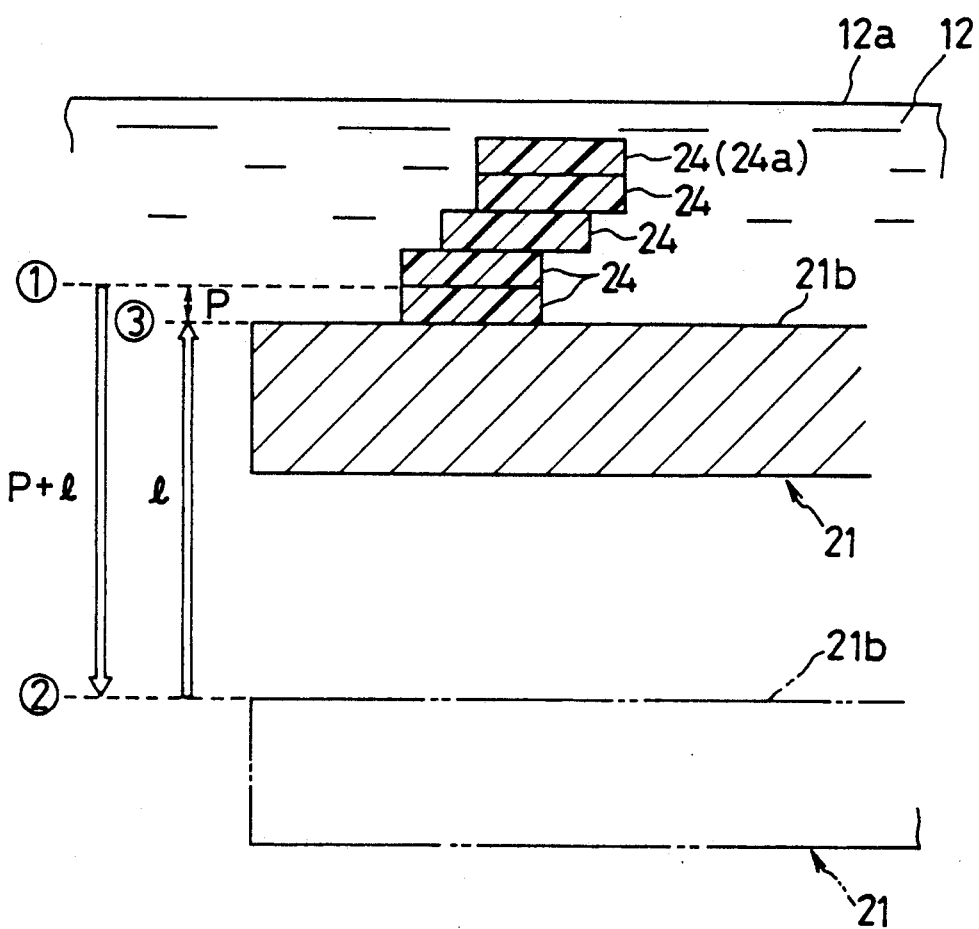

FIG. 4 shows a method of moving the base in the case of applying the present invention to the optical molding method shown in FIG. 3. FIG. 4 shows the state in which a sixth cured layer is being formed after the formation of the cured objects 24 in the five layers in total. In FIG. 4, after the cured object 24 (24a) in the fifth layer is formed in the state in which the upper surface 21b of the base 21 is located at a level indicated by the numeral (1), the base 21 is lowered by the distance p+1 so that the upper surface 21b of the base 21 is at a level indicated by the numeral (2). The base 21 is then lifted by the distance 1 so that the upper surface 21b is at a level indicated by the numeral (3), which is equivalent to move at the pitch p. In the state in which the upper surface 21b is at the level (2) in the course of the movement of the base 21, a very large gap 1 is formed between the liquid surface 12a of the photocurable resin 12 and the cured object 24a. Therefore, even if the uncured photocurable resin 12 has a considerably high viscosity, the photocurable resin 12 rapidly flows onto the cured object 24a.

It goes without saying that this method of moving the base is also adaptable to the formation of sixth and later layers. Alternatively, it is possible when the cured object 24 in the first layer is formed that after the upper surface 21b is made flush with the liquid surface 12a, the base 21 is lowered by the distance p+1 and then is lifted by the distance 1. This method enables the uncured photocurable resin 12 to uniformly flow on the base 21 very rapidly.

Figure 5:
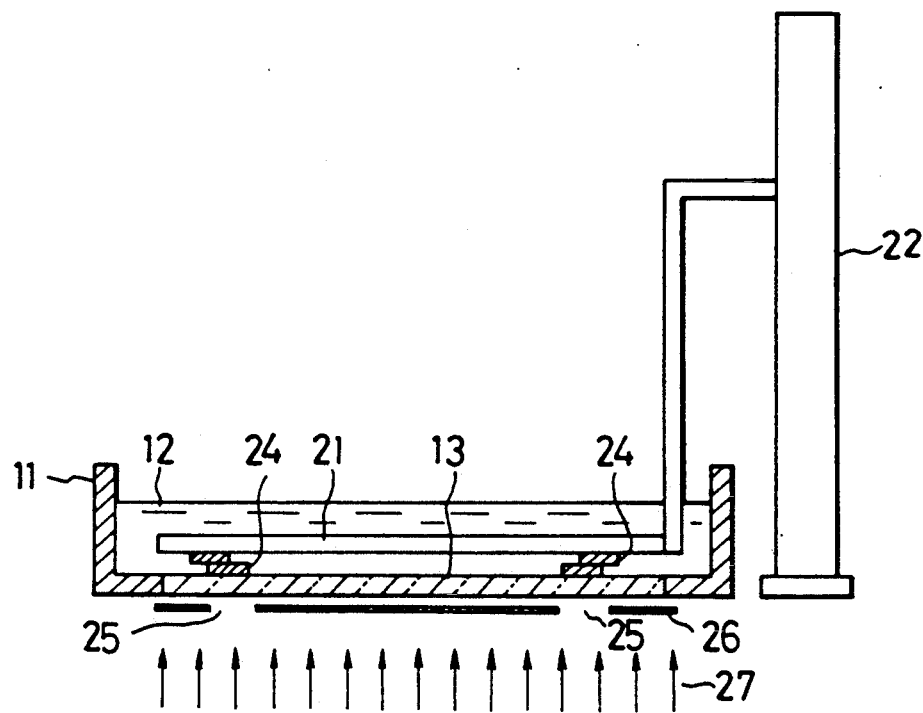
Figure 6:
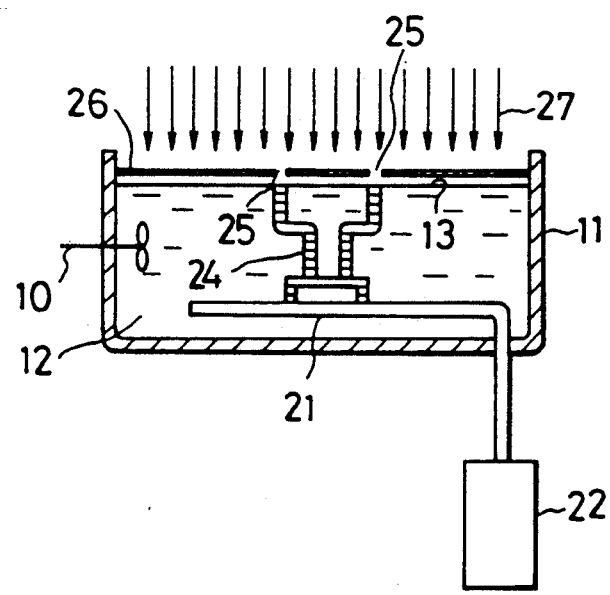
Figure 10:
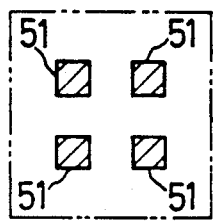
Figure 11A:
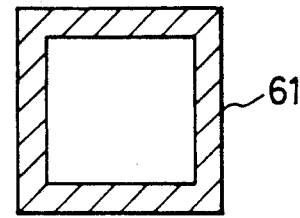
Figure 10:
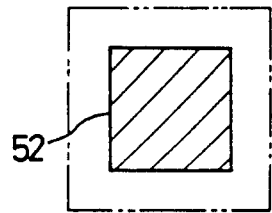
Figure 11B:
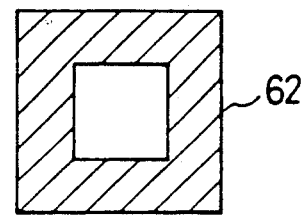
Figure 10:
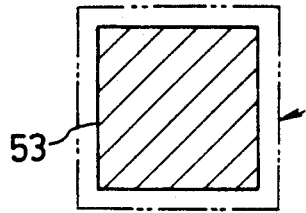
Figure 11C:
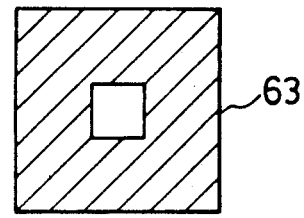
Figure 10:
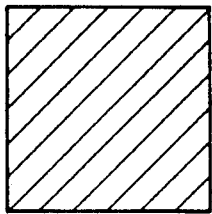
Figure 11D:
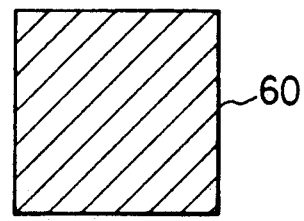
Figure 12:
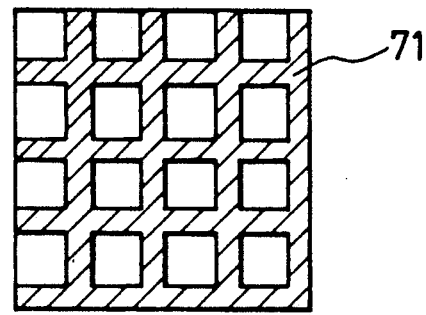
Figure 12:
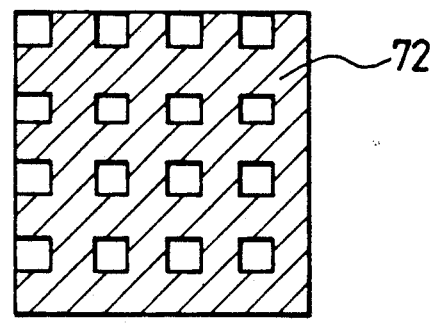
Figure 12:
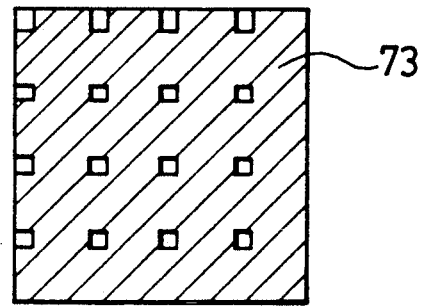
Figure 12:
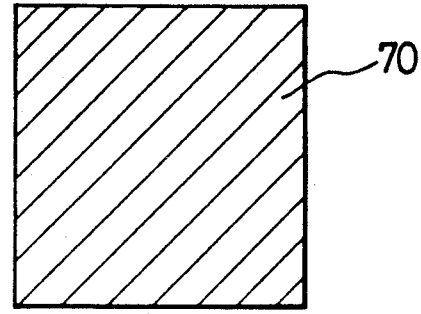

Although the cured object 24 is produced by the scanning of the light flux 14 in the method shown in FIG. 4, a known masking method may be applied to the present invention. For example, a mask 26 provided with slits 25 and having a configuration which corresponds to the section of the target object may be used instead, as shown in FIGS. 5 and 6. In FIGS. 5 and 6, the reference numeral 27 represents a parallel light flux. The other reference numerals in FIGS. 5 and 6 represent the corresponding elements to those in FIGS. 2 and 3.

As described above, according to the first embodiment of an optical molding method according to the present invention, the base is successively moved by a predetermined pitch and it is possible to start light radiation immediately after the movement of the base. It is therefore possible to greatly shorten the molding time. In addition, since this embodiment also enables a photocurable resin having a high viscosity to be used as a material, the range of photocurable resins to be selected is enlarged and hence production of objects of various materials are enabled.

FIG. 7 shows a second embodiment of an optical molding method according to the present invention. FIG. 7 shows a state in which the base 21 is brought into contact with the aperture 13 prior to the molding operation. The other structure is the same as in the apparatus shown in FIG. 2 and the same numerals are provided for the elements which are the same as those shown in FIG. 2.

By bringing the base 21 into contact with the aperture 13 in this way, bubbles which have adhered to the under surface of the base 21 and the upper surface of the aperture 13 are completely removed in such a manner as to be pushed out of the gap between the base 21 and the aperture 13. In addition, if the base 21 is moved away from the aperture 13 after they are brought into contact with each other in this way, it is possible to accurately set the initial gap (gap between the base 21 and the aperture 13) for forming the first cured layer at a predetermined value. The thickness of the first cured layer is therefore obtained at a high accuracy.

After bubbles are removed in the above-described way, the base 21 is moved away from the aperture 13 by a predetermined distance (e.g., about 0.1 to 1 mm) and light is radiated so as to form a first cured layer 24. Thereafter, the base 21 is further moved away from the aperture 13 by the predetermined distance and light is radiated so as to form a second cured layer 24. The cured object 24 of the photocurable resin 12 is formed between the base 21 and the aperture 13, and the cured object 24 adheres to both surfaces of the base 21 and the aperture 13, but the surfaces of the base 21 and the aperture 13 are so constructed that the cured object 24 adheres to the surface of the base 24 more strongly. Therefore, when the base 21 is moved after the first, second or later layers are formed, the cured object 24 is separated from the surface of the aperture 13 by the predetermined distance.

After all the layers of the intended configuration have been formed, the cured object 24 is removed from the base 21 and subjected to finishing, if necessary, thereby producing the target object.

In this embodiment, the base 21 is brought into contact with the aperture 13, but the base may be brought close to the aperture to such an extent as to remove bubbles from between the base 21 and the aperture 13.

Although the aperture 13 is provided on the bottom surface of the container 11 and light is radiated from below the container 11 in this embodiment, the aperture 13 may be provided on a side surface of the container 11 and light is radiated from the side surface of the container 11. In this case, the base 21 is gradually moved sideways in the production process.

In this embodiment, the scanning operation of the light flux 14 is carried out by moving the X-Y table 17 but it is possible to adopt an optical system instead in which the light emitted from the light source and reflected by a mirror (FIG. 3) is thereafter converged by the lens so as to radiate the light onto the photocurable resin. In this case, the scanning operation of the light flux 14 is carried out by rotating the mirror.

Although the cured object 24 is produced by the scanning of the light flux 14 in this embodiment, a known masking method may be applied to the second embodiment. For example, a mask 26 provided with slits 25 and having a configuration which corresponds to the section of the target object may be used instead, as shown in FIG. 5.

As described above, according to the second embodiment of an optical molding method, since bubbles are removed from the surfaces of the base and the aperture, it is possible to radiate light onto a predetermined point at a necessary intensity without scattering the light. This embodiment also enables smooth entrance of a photocurable resin into the gap between the base and the aperture. Owing to these advantages, according to this embodiment, it is possible to produce an object having a high dimensional accuracy in a predetermined molding time. In addition, prevention of the entrance of bubbles into a cured object is ensured.

Furthermore, according to this embodiment, it is possible to form the initial gap between the base and the aperture for forming a first cured layer with high accuracy, the dimensional accuracy for the thickness of the first layer is very high.

FIGS. 8(a) to 8(d) are plan views of the bottom surface of the container of an optical molding apparatus used for a third embodiment of an optical molding method according to the present invention. This embodiment is carried out by using an apparatus, for example, shown in FIG. 2.

The third embodiment is characterized in that when a cured layer is formed, the cured layer is divided into at least two divisions and successively forming the cured layer portions for the respective divisions and in that after each layer portion is formed, the base is once lifted before the next layer portion is formed so as to separate the cured layer portion from the aperture.

When a cured layer 30 of a square shape is formed by a method shown in FIGS. 8(a) to 8(d), a layer portion for a first division 31 is first formed. A predetermined gap t is first formed between the base (or the precedent cured layer already formed) and the aperture, and light is irradiated so as to form the layer for the first division 31. The base is then lifted so as to separate the cured portion for the first division 31 from the aperture, and the base is lowered again to form the gap t between the base (or the precedent cured layer) and the aperture. During this time, the layer portion formed in the first division 31 comes into contact with the base.

After a layer portion is formed in a second division 32, the base is lifted so as to separate the cured portion for the second division 32 from the aperture. The base is lowered again to form the gap t between the base (or the precedent cured layer) and the aperture and a layer portion for a third division 33 is formed.

The base is again lifted and lowered so as to separate the layer portion for the third division 33 from the aperture and form a gap t at a portion corresponding to a fourth division 34. In this state, light is radiated onto the fourth division 34 so as to form a layer portion in the fourth division 34. Thus, the total portion of the cured layer 30 is completed.

After the formation of the cured layer 30, a next cured layer to be laminated on the cured layer 30 is formed.

In this way, since the cured layer is separated from the aperture after the layer portion for one division is formed and before the layer portion for the next division is formed, a small force suffices for lifting the cured layer at the time of separating the cured layer from the aperture. Therefore, the separation between the cured layer and the base is prevented and the separation between the cured layers is also prevented. In addition, an elevator having a small driving force suffices.

FIGS. 9(a) to 9(d), 10(a) to 10(d), 11(a) to 11(d) and 12(a) to 12(d) show modifications of the third embodiment. In the example shown in FIGS. 9(a) to 9(d), the central portion of the cured layer 40 is first formed. The cured layer 40 is divided into divisions 41, 42, 43 and 40, which are arranged in an ascending scale of size. The cured layer 40 is finally formed.

In the example shown in FIGS. 10(a) to 10(d), small spotted divisions 51 are first formed and then larger divisions 52 and 53 are formed in that order. Finally, a cured layer 50 is formed.

In the example shown in FIGS. 11(a) to 11(d), a cured layer 60 is formed from the outer peripheral side, and the layer portions for divisions 61, 62 and 63 are grown in that order. Finally, the cured layer 60 is completed.

In the example shown in FIGS. 12(a) to 12(d), a layer portion for a lattice division 71 is first formed, and larger layer portions for lattice divisions 72 and 73 are next formed in that order. Finally, a cured layer 70 is completed.

In the modifications of the third example shown in FIGS. 9(a) to 9(d), 10(a) to 10(d), 11(a) to 11(d) and 12(a) to 12(d), the base is lifted after the formation of the cured layer portions for the divisions 41, 51, 61 and 71, respectively, and before curing for the divisions 42, 52, 62 and 72, respectively, so as to separate the cured layer in the divisions 41, 51, 61 and 71, respectively, from the aperture. Thereafter, the base is lowered to form the cured layer portions for the divisions 42, 52, 62 and 72, respectively.

Similarly, the base is lifted and lowered between the step of forming the cured layer portions in the divisions 42, 52, 62 and 72 and the step of forming the cured layers in the divisions 43, 53, 63 and 73, respectively, and between the step of forming the cured layers in the divisions 43, 53, 63 and 73 and the final step of forming the cured layer 40, 50, 60 and 70, respectively, so as to separate the respective cured layer portions from the aperture.

Although square cured layers 30, 40, 50, 60 and 70 are formed in the third embodiment, the shape of the cured layer is optional. The portion, number and the shape of the divisions are also optional.

In the third embodiment, all the cured layers laminated may be formed in accordance with the above-described curing process executed by dividing a cured layer into small divisions. Alternatively, only cured layers having a large area, for example, may be formed by the above-described curing process and the other layers having a small area may be cured at one time as in the prior art.

Although the aperture 13 is provided on the bottom surface of the container 11 and light is radiated from below the container 11 in this embodiment, the aperture 13 may be provided on a side surface of the container 11 and light is radiated from the side surface of the container 11. In this case, the base 21 is gradually moved sideways in the production process.

In this embodiment, the scanning operation of the light flux 14 is carried out by moving the X-Y table 17 but it is possible to adopt an optical system instead in which the light emitted from the light source and reflected by a mirror (FIG. 3) is thereafter converged by the lens so as to radiate the light onto the photocurable resin. In this case, the scanning operation of the light flux 14 is carried out by rotating the mirror.

Although the cured object 24 is produced by the scanning of the light flux 14 in this embodiment, a known masking method may be applied to the third embodiment. For example, a mask 26 having slits 25 which corresponds to the section of the target object may be used instead, as shown in FIG. 5.

Figure 13:
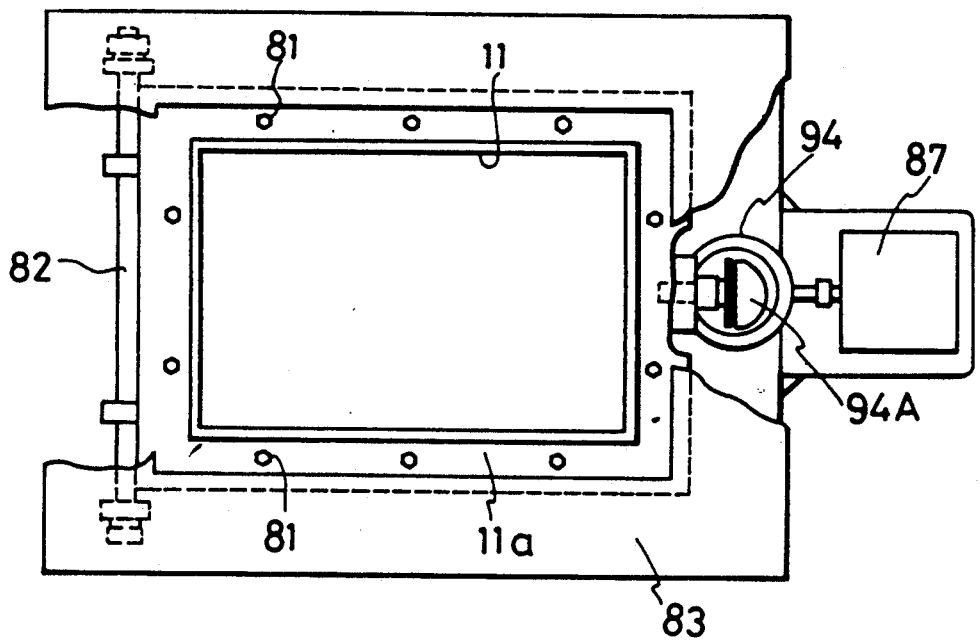
FIG. 13 is a plan view of the mechanism for inclining the container in an optical molding apparatus suitable for a fourth embodiment of an optical molding method according to the present invention.
Figure 14:
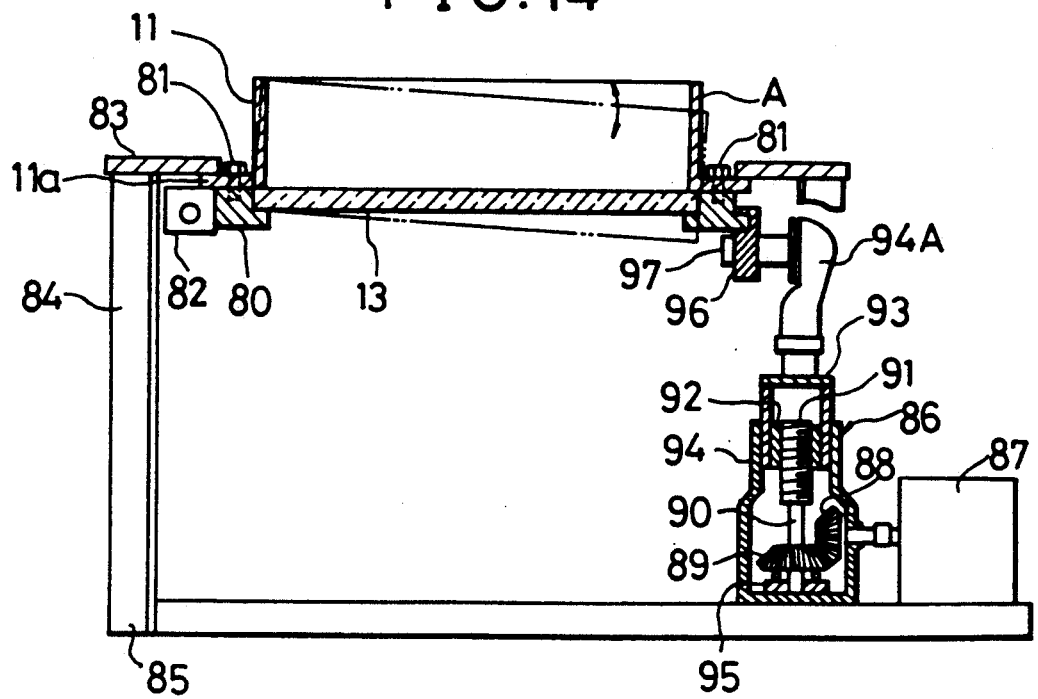
FIG. 14 is a vertical sectional view of the mechanism shown in FIG. 13.

FIGS. 13 and 14 are a plan view and a vertical sectional view, respectively, of the container and a mechanism for inclining the container of an optical molding apparatus suitable for executing a fourth embodiment of an optical molding method according to the present invention.

The aperture 13 is attached to the bottom surface of the container 11 by a frame 80. The frame 80 is secured to the flange portion 11a of the container 11 by bolts 81, and the outer periphery of the aperture 13 is clamped between the inner peripheral portion of the frame 80 and the flange portion 11a of the container 11. One end portion of the container 11 is supported by a support table 83 through a pivot 82. The support table 83 is attached to a machine base 85 through a leg 84.

The other end side A of the container 11 is vertically movable by means of a lift 86. The lift 86 is mainly composed of a stepping motor 87 secured to the machine base 85, a bevel gear 88 secured to the end of the rotational shaft of the stepping motor 87, a bevel gear 89 intermeshing with the bevel gear 88, a vertical rotational shaft 90 to which the bevel gear 89 is secured, a male screw 91 secured to the upper end of the vertical rotational shaft 90, a female screw 92 in the form of a nut engaged with the male screw 91, a cylindrical gear holder 93 with the female screw 92 secured to the inner peripheral surface thereof, a guide cylinder 94 inserted into the gear holder 93 with the lower end thereof secured to the pedestal 85, and a link ball mechanism 94A for connecting the gear holder 93 to the end side A of the frame 80. The reference numeral 95 denotes a bearing for holding the vertical rotational shaft 90. The reference numeral 96 represents a bracket secured to the end side A of the frame 80. The link ball mechanism 94A is connected to the bracket 96 through a connecting shaft 97.

On the underside of the aperture 13, the X-Y table 17, the light emitting portion 15 attached to the X-Y table 17, the optical fiber 16 connected to the light emitting portion, etc. (not shown) are disposed. The base 21 (not shown) is disposed in the container 11 so as to be lifted and lowered by the elevator 22 (not shown). The elevator 22, the X-Y table 17, the lift 86 and the light source 20 are controlled by the computer 23. This structure is the same as in the apparatus shown in FIG. 2.

When an optical molding method of the present invention is carried out by using an apparatus having the above-described structure, the base 21 is first moved away from the aperture 13 which is held in the horizontal state by a predetermined distance (e.g., about 0.1 to 1 mm), and light is irradiated so as to form a first cured layer 24. Thereafter, the aperture 13, which is integral with the container 11, is inclined by the operation of the lift 86. The cured layer 24 formed between the base 21 and the aperture 13 is thereby separated from the aperture 13 from the side A. Therefore, the cured layer 24 is separated from the aperture 13 by a comparatively weak force. After the cured layer 24 is separated from the aperture 13, the base 21 is moved upward by the distance corresponding to the thickness of a second layer, and the lift 86 is operated so as to return the aperture 13 to a horizontal state. Light is then radiated again so as to form the second cured layer 24. After the second cured layer 24 is formed, the aperture 13 is inclined by the operation of the lift 86 so as to separate the second cured layer 24 from the aperture 13. Thereafter, the base 21 is lifted by the distance corresponding to the thickness of a third layer, and the lift 86 is operated so as to return the aperture 13 to a horizontal state. This process is repeated so as to form third and later cured layers in series, thereby obtaining the total layers of the intended configuration.

After all the layers of the intended configuration have been formed, the cured object 24 is removed from the base 21 and subjected to finishing, if necessary, thereby producing the target object.

According to this embodiment, the cured layer 24 is only separated from the bonded surface of the aperture 13, and the target object is obtained with reliability. By inclining the aperture 13, the cured layer is separated only from the bonded surface of the aperture 13 and the separating force at this time is small. Therefore, the cured layer 24 and the base 21 are constantly in the firmly bonded state. The bonded surface between the cured layers 24 is not separated. In addition, an elevator having a small driving force is usable as the elevator 22.

Figure 15:
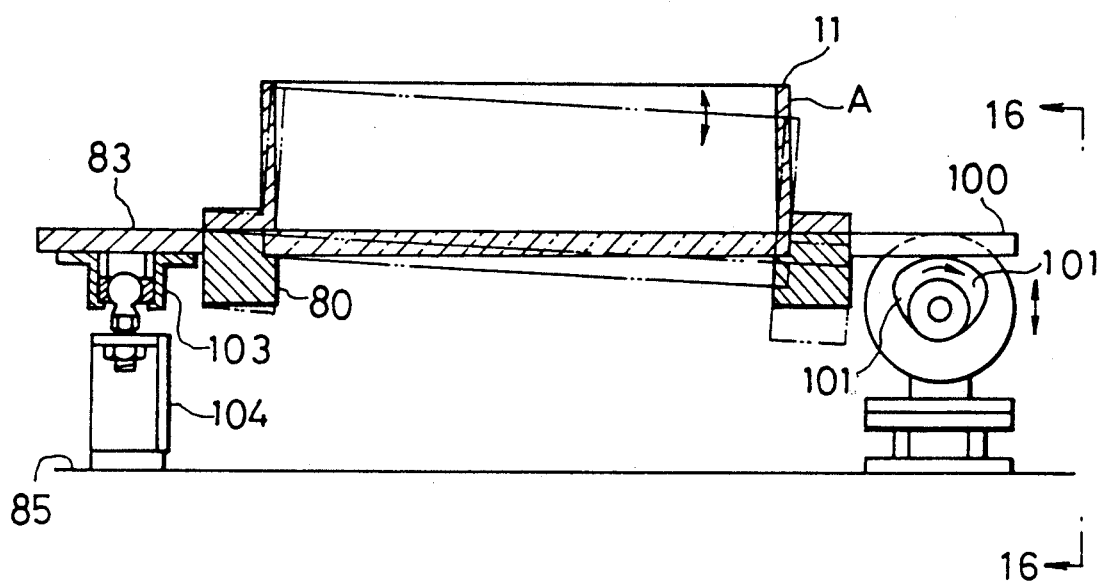
FIG. 15 is a vertical sectional view of another mechanism for inclining a container.
Figure 16:
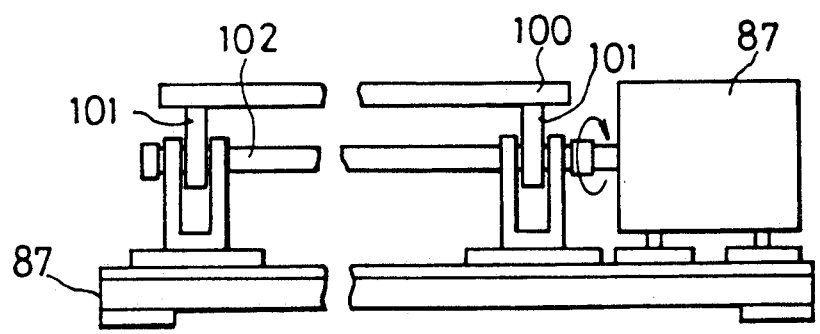
FIG. 16 is a sectional view of the mechanism shown in FIG. 15, taken along the line 16—16 in FIG. 15.

FIGS. 15 and 16 are a vertical sectional view of another mechanism for inclining the container 11 and a side elevational view of the main part thereof, respectively. The mechanism for inclining the container 11 shown in FIGS. 15 and 16 adopts a cam mechanism. A cam plate 100 is secured to the end side A of the frame 80 for supporting the aperture 13, and is engaged with a cam 101. The cam 101 is secured to a cam shaft 102, and the cam shaft 102 is rotated by the stepping motor 87.

The frame 80 of the container is secured to the support table 83 at one end, and the support table 83 is supported by the machine base 85 through a link ball 103 and a support block 104.

In the mechanism for inclining the container shown in FIGS. 15 and 16, when the stepping motor 87 is rotated, the cam 101 is rotated, thereby vertically moving the cam plate 100 and inclining the container 11. In the case of using the mechanism shown in FIGS. 15 and 16, the container 11 is inclined before the base 21 (not shown) is lifted in the same way as in the case of using the mechanism shown in FIGS. 13 and 14. The cured layer 24 (not shown) is thereby separated from the bonded surface of the aperture 13. Thus, the formation of the target object is also ensured by using the mechanism shown in FIGS. 15 and 16. In addition, an elevator having a small driving force is usable as the elevator 22.

In this embodiment, the aperture 13 is provided integrally with the container 11 and the aperture 13 and the container 11 are integrally inclined, but the structure for selectively inclining the aperture 13 and maintaining the container 11 in a fixed state may be adopted and the cured layer and the aperture may be separated by inclining the aperture solely.

In the fourth embodiment, an air cylinder or a hydraulic cylinder may be used for driving the aperture 13 in place of the motor. Another mechanism driven by air pressure or hydraulic pressure may also be used, or the aperture 13 may be manually operated by an operator or the like.

Although the aperture 13 is provided on the bottom surface of the container 11 and light is radiated from below the container 11 in this embodiment, the aperture 13 may be provided on a side surface of the container 11 and light is radiated from the side surface of the container 11. In this case, the base 21 is gradually moved sideways in the production process.

In this embodiment, the scanning operation of the light flux 14 is carried out by moving the X-Y table 17 but it is possible to adopt an optical system instead in which the light emitted from the light source and reflected by a mirror (FIG. 3) is thereafter converged by the lens so as to radiate the light onto the photocurable resin. In this case, the scanning operation of the light flux 14 is carried out by rotating the mirror.

Although the cured object 24 is produced by the scanning of the light flux 14 in this embodiment, a known masking method may be applied to the fourth embodiment For example, a mask 26 having slits 25 which corresponds to the section of the target object may be used instead, as shown in FIG. 5. In this case, the aperture 13 is inclined, if necessary.

As described above, according to the third and fourth embodiments of an optical molding method of the present invention, since the cured layer is constantly separated from the bonded surface of the aperture when the base is lifted, the target object is obtained with reliability. That is, there is no possibility of the cured layer being separated from the base or another cured layer. In addition, an elevator having a small driving force suffices and a base having small strength and rigidity is also usable.

In the present invention, various resins which are cured by light irradiation are usable. For example, modified polyurethane methacrylate, origo-ester acrylate, urethane acrylate, epoxy acrylate, photosensitive polyimide and aminoalkyd will be cited.

As the light, various kinds of lights such as visible light and ultraviolet light may be used in accordance with the photocurable resin used. The light may be used in the form of ordinary light, but if a laser beam is used, it is possible to enhance the energy level, shorten the molding time and enhance the molding accuracy by utilizing the good condensing property.

While there has been described what are at present considered to be preferred embodiments of the invention, it will be understood that various modifications may be made thereto, and it is intended that the appended claims cover all such modifications within the true spirit and scope of the invention.

What is claimed is:

1. An optical molding method comprising the steps of:
   (a) moving a base away from a horizontally-disposed aperture by a predetermined distance;
   (b) irradiating light through said aperture to cure a photocurable resin and form a first cured layer on said base;
   (c) inclining said aperture relative to said base from a horizontally-disposed position so that said first cured layer is separated from said aperture;
   (d) moving said base away from said aperture by a distance corresponding to a thickness of a second layer;
   (e) returning said aperture to said horizontally-disposed position;
   (f) irradiating light through said aperture to cure a photocurable resin and form a second cured layer on said first cured layer;
   (g) inclining said aperture relative to said base from said horizontally-disposed position so that said second cured layer is separated from said aperture; and
   repeating steps (d)-(g) to form third and later cured layer in series, thereby obtaining a cured object.

2. A method according to claim 1, wherein said aperture and said container are integrally provided and said aperture is inclined by inclining said container.

* * * * *